(12) United States Patent
Saint-Leger et al.

(10) Patent No.: US 9,682,629 B2
(45) Date of Patent: Jun. 20, 2017

(54) METHOD FOR MANAGING AN ALTERNATOR COMBINED WITH AT LEAST ONE POWER BATTERY AND DRIVEN BY A HEAT ENGINE

(71) Applicant: RENAULT s.a.s., Boulogne Billancourt (FR)

(72) Inventors: Gerard Saint-Leger, Versailles (FR); Sophie Demure, Antony (FR)

(73) Assignee: RENAULT s.a.s., Boulogne Billancourt (FR)

( * ) Notice: Subject to any disclaimer, the term of this patent is extended or adjusted under 35 U.S.C. 154(b) by 316 days.

(21) Appl. No.: 14/362,786

(22) PCT Filed: Nov. 22, 2012

(86) PCT No.: PCT/EP2012/073307
§ 371 (c)(1),
(2) Date: Jun. 4, 2014

(87) PCT Pub. No.: WO2013/083409
PCT Pub. Date: Jun. 13, 2013

(65) Prior Publication Data
US 2014/0361611 A1    Dec. 11, 2014

(30) Foreign Application Priority Data
Dec. 6, 2011 (FR) ...................... 11 61220

(51) Int. Cl.
*B60L 11/12* (2006.01)
*B60L 11/18* (2006.01)
(Continued)

(52) U.S. Cl.
CPC ................ *B60L 11/12* (2013.01); *B60L 1/003* (2013.01); *B60L 11/005* (2013.01); *B60L 11/14* (2013.01);
(Continued)

(58) Field of Classification Search
CPC ............ B60L 1/003; B60L 11/12; B60L 11/14
See application file for complete search history.

(56) References Cited

U.S. PATENT DOCUMENTS 6,166,523 A * 12/2000 Singh .................... H02J 7/1446
320/104
2004/0164616 A1* 8/2004 Obayashi ................. B60K 6/46
307/18
(Continued)

FOREIGN PATENT DOCUMENTS

EP    1 454 786 A3    11/2006
FR    2 851 516 A1    8/2004
(Continued)

OTHER PUBLICATIONS

International Search Report issued Jul. 4, 2013 in Corresponding PCT/EP2012/073307.
(Continued)

*Primary Examiner* — Rexford Barnie
*Assistant Examiner* — Daniel Kessie
(74) *Attorney, Agent, or Firm* — Oblon, McClelland, Maier & Neustadt, L.L.P.

(57) ABSTRACT

A method for managing a motor vehicle including a first battery connected to an alternator and an electrical network, the alternator operable either at a positive low alternator voltage or a high alternator voltage higher than the low alternator voltage, the method including: estimating a potential recharging current strength that the first battery could absorb if it was, at that moment, powered by the high alternator voltage; estimating a first alternator yield corresponding to a current rotation speed of the alternator, and to a strength of consumed current actually fed into the network; estimating a second alternator yield corresponding to the current rotation speed of the alternator and to the sum of strengths of a potential recharging current of the battery and
(Continued)

Figure 1:
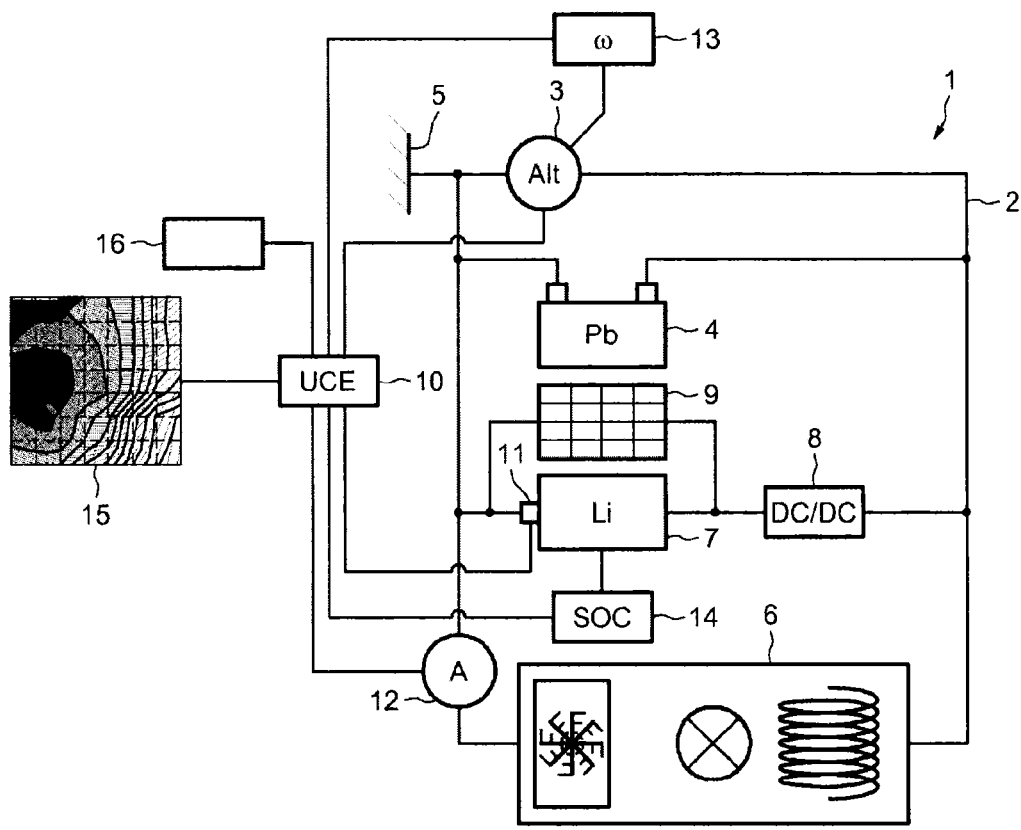

of the consumed current; and imposing a high alternator voltage if the difference between the first yield and the second yield is higher than a first threshold.

10 Claims, 3 Drawing Sheets

(51) Int. Cl.
*H02J 7/14* (2006.01)
*H02J 7/16* (2006.01)
*B60L 1/00* (2006.01)
*B60L 11/00* (2006.01)
*B60L 11/14* (2006.01)
*B60L 15/20* (2006.01)

(52) U.S. Cl.
CPC ........ *B60L 11/1809* (2013.01); *B60L 11/1866* (2013.01); *B60L 11/1868* (2013.01); *B60L 15/2009* (2013.01); *H02J 7/1446* (2013.01); *H02J 7/163* (2013.01); *B60L 2210/10* (2013.01); *B60L 2240/421* (2013.01); *B60L 2240/80* (2013.01); *B60Y 2400/112* (2013.01); *Y02T 10/645* (2013.01); *Y02T 10/70* (2013.01); *Y02T 10/7005* (2013.01); *Y02T 10/7011* (2013.01); *Y02T 10/7016* (2013.01); *Y02T 10/7022* (2013.01); *Y02T 10/7061* (2013.01); *Y02T 10/7066* (2013.01); *Y02T 10/7077* (2013.01); *Y02T 10/7216* (2013.01); *Y02T 10/7275* (2013.01); *Y02T 10/92* (2013.01)

(56) References Cited

U.S. PATENT DOCUMENTS

| | | | |
|---|---|---|---|
| 2006/0232238 A1* | 10/2006 | Horii | B60K 6/28 320/104 |
| 2011/0001352 A1* | 1/2011 | Tamura | B60R 16/033 307/9.1 |

FOREIGN PATENT DOCUMENTS

| | | |
|---|---|---|
| JP | 2004-229447 A | 8/2004 |
| JP | 2005-323425 A | 11/2005 |
| JP | 2008-199822 A | 8/2008 |
| JP | 2009-1213 A | 1/2009 |
| WO | WO 01/52382 A1 | 7/2001 |

OTHER PUBLICATIONS

Volkan Sezer, et al., "A Novel ECMS and Combined Cost Map Approach for High-Efficiency Series Hybrid Electric Vehicles", IEEE Transactions on Vehicular Technology, vol. 60, No. 8, Oct. 2011, XP011362933, pp. 3557-3570.

Sunil Adhikari, et al., "An Online Power-Balancing Strategy for a Parallel Hybrid Electric Vehicle Assisted by an Integrated Starter Generator", IEEE Transactions on Vehicular Technology, vol. 59, No. 6, XP011310216, Jul. 2010 pp. 2689-2699.

English Translation of Office Action mailed Sep. 6, 2016 in Japanese Patent Application No. 2014-545160.

* cited by examiner

METHOD FOR MANAGING AN ALTERNATOR COMBINED WITH AT LEAST ONE POWER BATTERY AND DRIVEN BY A HEAT ENGINE

The invention relates to electric power supply systems for motor vehicles with propulsion by heat engine or thermo-electric hybrid propulsion, and notably to electric power supply systems comprising several batteries of different types.

Specifically, the use of different types of batteries in parallel may be desirable in order to benefit, for example, from the good capacity of a lead battery to supply energy for a cold start, and from the high specific energy as well as the higher endurance in terms of charging and discharging cycles of a battery of lithium-ion type.

The patent application US 2011001352 thus describes a system where both types of battery are present, the no-load voltages and the internal resistances of the two batteries being chosen so that, for a constant alternator voltage, it is preferably the lithium battery that discharges and then recharges, the lead battery thus undergoing a smaller number of charging and discharging cycles.

The use of the lead battery is then preferably reserved for the starting phases of the vehicle.

To make it possible to obtain such a configuration, the maximum no-load voltage of the lithium battery must remain relatively close to the maximum no-load voltage of the lead battery. The maximum energy capacity of the lithium battery is therefore limited by this.

Such a system makes it possible to increase the lifetime of the lead battery, but makes it necessary to limit the performances of the lithium batteries used. Furthermore, the constant voltage of the alternator must be chosen sufficiently high to enable the lead battery and the lithium battery to be simultaneously recharged, which induces an overconsumption of fuel compared with a system equipped with a lead battery only.

The patent application WO 01/52382 makes it possible to turn on or deactivate an alternator as a function of the state of charge of a battery or of a group of batteries of a vehicle, and also as a function of a type of vehicle driving. In this way fuel overconsumption is avoided during periods when the battery is already sufficiently charged, or during periods when the yield of the engine is not very favorable.

The application EP 1454786 describes a hybrid vehicle with two batteries, wherein the charging of the high voltage battery of the vehicle is authorized only when the heat engine of the vehicle is operating in a high-yield region.

The Applicant proposes an electric power supply system for a vehicle comprising two batteries, this system making it possible not only to increase the lifetime of the lead battery, but also to reduce the average fuel consumption of the vehicle. With this aim, the proposed system comprises a controllable alternator capable of delivering a low alternator voltage, chosen to keep charged one of the batteries intended to provide the necessary energy when starting the vehicle, and also capable of delivering a high alternator voltage, chosen to make it possible to simultaneously power the on-board network of the vehicle, and to recharge the other battery to a level of charge that allows this second battery to power the network during the periods of operation at the low alternator voltage. The alternator is preferably controlled at the high alternator voltage during the phases of regenerative braking of the vehicle. During extended periods of driving without regenerative braking, for example during extended driving on a highway, the battery dedicated to powering the on-board network will therefore gradually discharge. One of the aims of the invention is to propose a method for managing the alternator that avoids excessively discharging the battery powering the on-board network, while limiting the overall fuel consumption of the vehicle.

With this aim, an electric power supply system for a vehicle including a heat engine able to propel the vehicle comprises:
- a network of at least one electricity consuming member,
- a first electric accumulator battery connected to the network,
- a controllable alternator connected to the network, driven by the engine, and able to deliver electric power to the network at a setpoint voltage controllable to at least a strictly positive low alternator voltage, and to a high alternator voltage strictly higher than the low alternator voltage,
- an ammeter making it possible to measure the instantaneous intensity consumed by the power network,
- an estimator of the state of charge of the first battery making it possible to estimate the intensity of the potential recharging current that the battery would be capable of absorbing if it was at that instant powered at the high alternator voltage, characterized in that the system also comprises:
- a meter of the speed of rotation of the alternator,
- an electronic control unit linked to the meter, to the state of charge estimator and to the ammeter, and linked to a map of the alternator yield as a function of the alternator speed and of the intensity output by the alternator, the electronic control unit being configured to estimate a first alternator yield corresponding to the current speed of rotation of the alternator, and to the intensity of current consumed actually drawn from the network, to estimate a second alternator yield corresponding to the current speed of rotation of the alternator and to the sum of the intensities of the potential recharging current of the battery and of the current consumed, and to impose the high alternator voltage if the difference between the second yield and the first yield is higher than a first threshold. The first threshold can be defined as an absolute value or as a relative value. The second setpoint voltage can, for example, be imposed if the second yield is higher than the first yield as a percentage of a predefined value that can for example be chosen between 5% and 30%, for example close to 10% as an absolute value. An ammeter is understood to be a sensor or an estimating device linked to one or more sensors and making it possible to determine the intensity of the current flowing in the electrical circuit. According to a preferred embodiment, the low alternator voltage is the operating voltage imposed by default on the alternator in the regenerative braking phases of the vehicle.

According to an advantageous embodiment, the electronic control unit is configured to stop imposing a high alternator voltage if the difference between the second yield and the first yield again becomes lower than a second threshold lower than or equal to the first threshold.

According to an embodiment that can be combined with the preceding one, the electronic control unit is configured to impose a low alternator voltage if the state of charge of the battery becomes higher than a third threshold or if the potential recharging current becomes lower than a fourth threshold.

The electronic control unit can be linked to an estimator of the engine yield, and be configured to impose the high alternator voltage only if the product of the engine yield and the second yield is higher than a fifth threshold. The engine yield can for example be obtained from a map linking the operating point of the engine {engine torque, speed of rotation of the engine} and a yield of the engine.

Preferably, the system comprises a second electric accumulator battery connected to the alternator and able to power a starter able to launch the engine of the vehicle, the second battery having a second maximum no-load voltage that is lower than a first maximum no-load voltage of the first battery, and which is lower than the low alternator voltage.

According to an advantageous embodiment, the system comprises a driving monitoring unit linked to the alternator, able to detect various types of driving of the vehicle, which is configured to impose the high alternator voltage during at least certain phases of driving of the vehicle including phases of regenerative braking, and to impose the low alternator voltage during other phases of driving that consume more fuel than the first driving phases, unless the electronic control unit imposes the high alternator voltage. The driving monitoring unit can notably be configured to impose a high alternator voltage when the vehicle is in a regenerative braking phase, and to impose the low alternator voltage when the vehicle is in a phase of acceleration of the engine, or in a mode of driving of the highway type. According to the variant embodiments, it is possible to configure the electronic control unit so that it imposes the high alternator voltage only in cases where the driving speed of the vehicle has been stable for a time period higher than a sixth threshold, or in cases where the driving mode of the vehicle has been the same for a time period higher than a seventh threshold.

According to a particular embodiment, the system furthermore comprises a regulator able to vary the drive ratio between the speed of rotation of the alternator and the speed of rotation of the engine. The driving monitoring unit can then be linked to the regulator and be configured to impose at least a first drive ratio if it detects driving of city type, and to impose at least a second drive ratio lower than the previous one, if it detects driving of highway type. The term drive ratio here refers to the quotient of the speed of rotation of the alternator divided by the speed of rotation of the engine.

According to another particular embodiment, the system comprises a regulator able to vary the drive ratio between the speed of rotation of the alternator and the speed of rotation of the engine, the electronic control unit being linked to the regulator and being configured to compute a first yield and a second yield corresponding to the current speed of the alternator, as well as a first and a second yield corresponding to a different drive ratio from the current ratio. The electronic control unit is then configured so that, if the difference between the second yield and the first yield is higher than the first threshold for at least one of the two drive ratios, the control unit imposes the drive ratio making it possible to obtain the highest second yield.

According to another aspect, a method for managing a motor vehicle is proposed. The vehicle is equipped with a first battery connected to an alternator and to a power network of the vehicle, the alternator being controllable to operate either at a strictly positive low alternator voltage, or at least at a high alternator voltage strictly higher than the low alternator voltage. The intensity of the potential recharging current that the first battery would be capable of absorbing if it was at that instant powered at the high alternator voltage is estimated. A first alternator yield is estimated corresponding to the current speed of rotation of the alternator, and to the intensity of current consumed actually drawn from the network. A second alternator yield is estimated corresponding to the current speed of rotation of the alternator and to the sum of the intensities of the potential recharging current of the battery and of the current consumed, and a high alternator voltage is imposed if the difference between the second yield and the first yield is higher than a first threshold.

According to a preferred embodiment, the drive ratio is varied between the speed of rotation of the alternator and the speed of rotation of an engine driving the alternator, so as to increase the difference between the second yield and the first yield, for at least a range of speeds of rotation of the engine.

Figure 2:
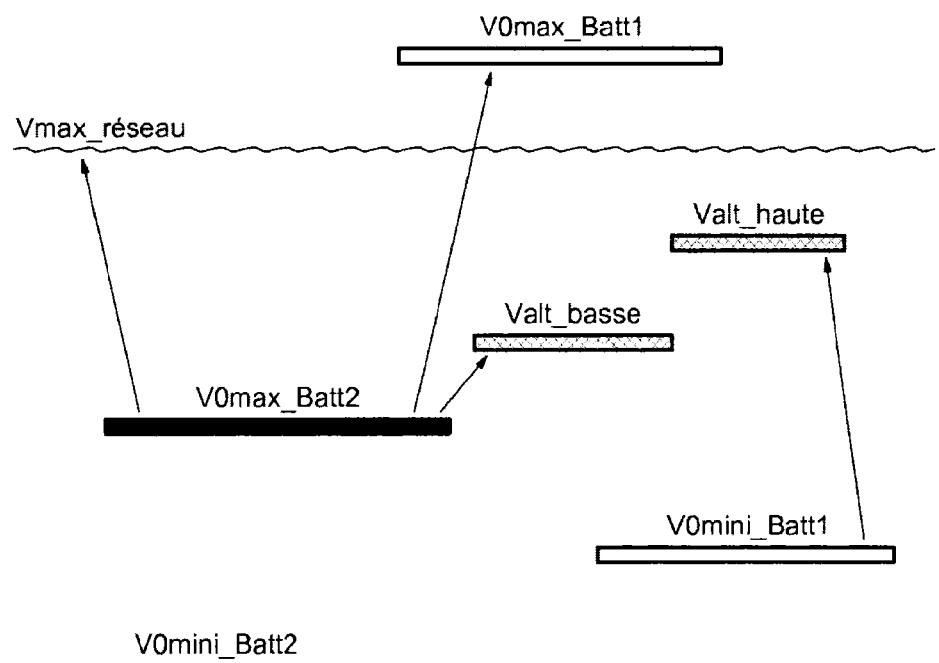
Figure 3:
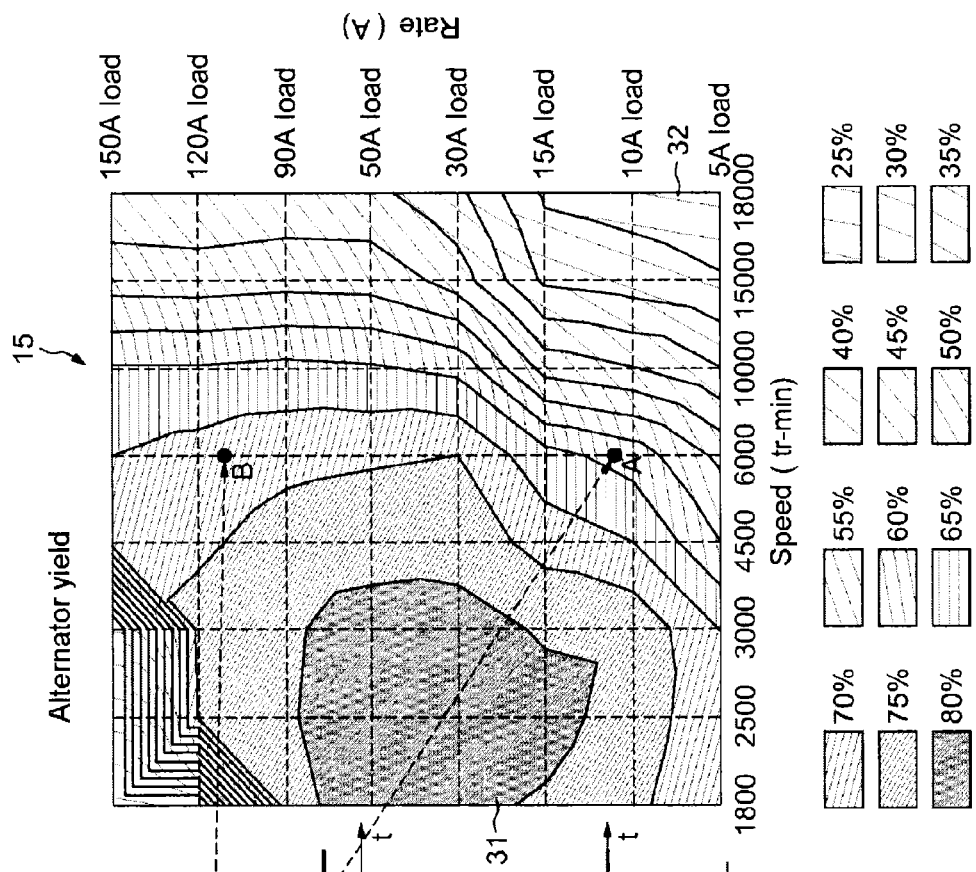
Figure 4:
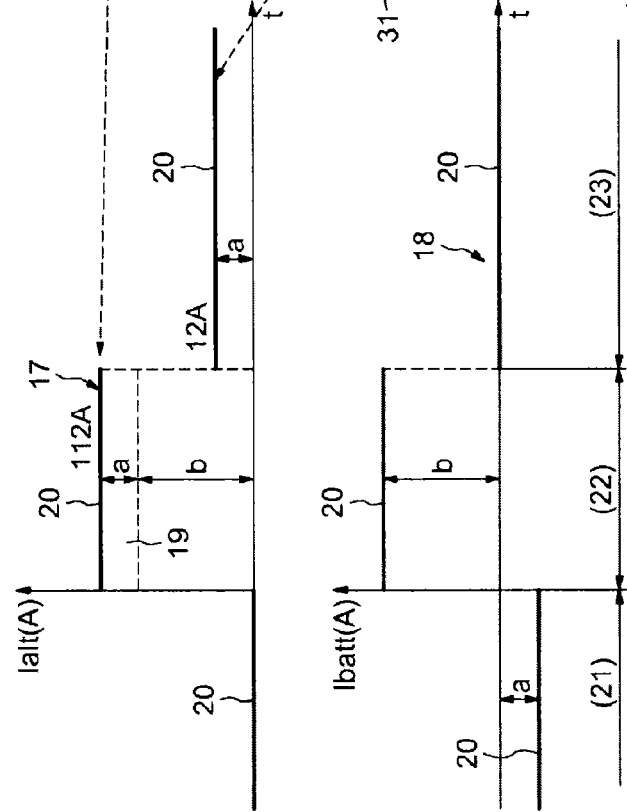
Figure 5:
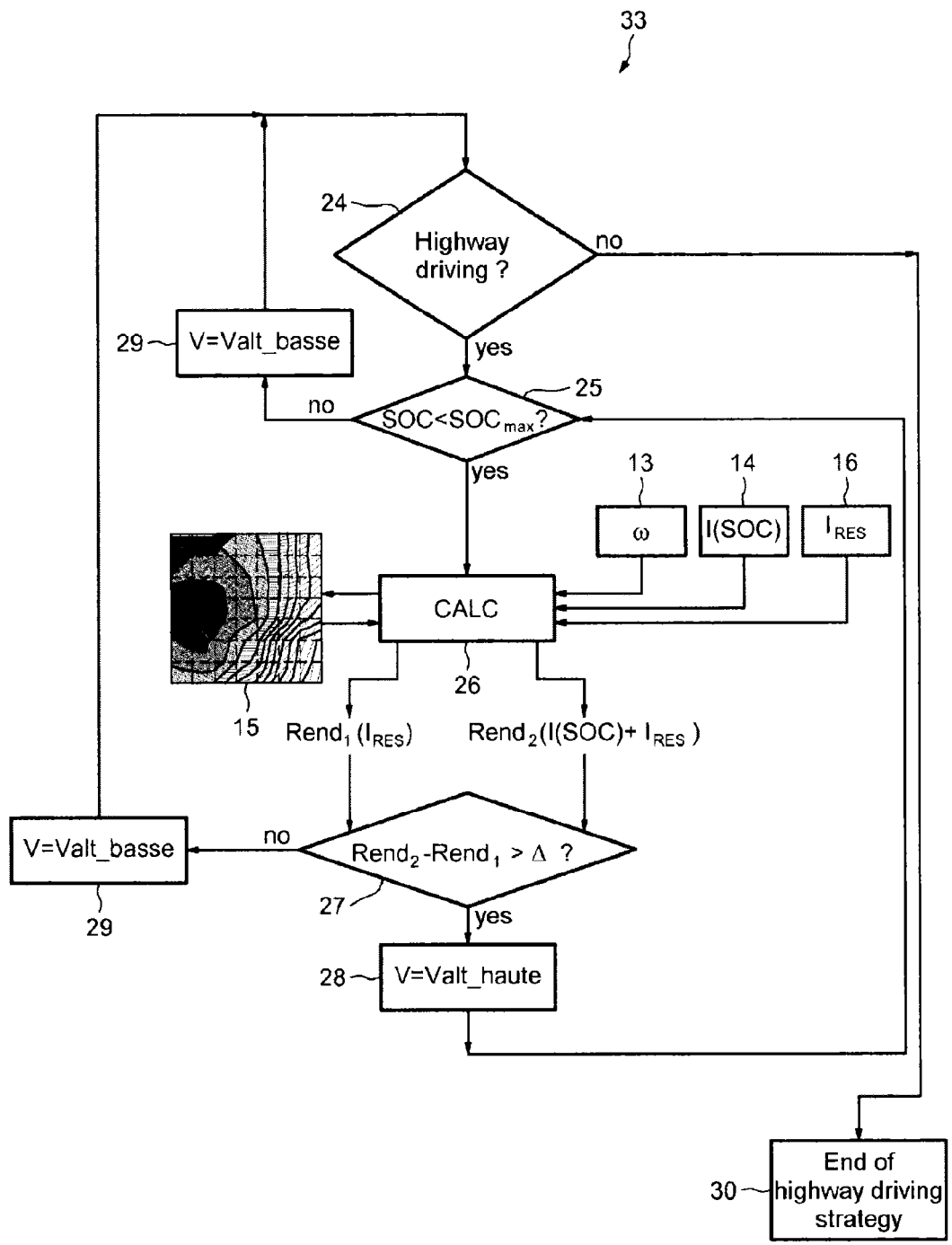

Other aims, features and advantages of the invention will become apparent upon reading the following description, given solely by way of non-limiting example, and made with reference to the appended drawings, wherein:

FIG. 1 is a schematic representation of a power supply system according to the invention, FIG. 2 is a graph representing the relative levels of the various voltages involved in the operation of the power supply system in FIG. 1, FIG. 3 is a graph illustrating various levels of currents of an alternator and a battery of a power supply system according to the invention, FIG. 4 is an example of a map used for the implementation of the invention, FIG. 5 is an example of a control algorithm of a power supply system according to the invention.

As illustrated in FIG. 1, an electric power supply system 1 for a vehicle comprises a power network 2, an alternator 3, a first battery 7, for example a battery of lithium-ion type, a second battery 4, for example a lead battery and an electronic control unit 10. The first battery 7 is provided with a switch 11 allowing it to be disconnected from the network 2. The alternator 3 is able to convert mechanical energy drawn from a shaft linked to a heat engine (not represented) into electrical energy sent over the power network 2. The power supply system also comprises an ammeter 12 interposed in the network 2 and connected in series with the consuming elements 6, so as to be able to measure the total current absorbed at each instant by these consuming elements, a meter 13 able to estimate the instantaneous speed of rotation ω of the alternator 3 (for example by directly measuring the speed of rotation of the alternator, or by measuring the speed of rotation of the engine driving the alternator and by deducing the speed of rotation of the alternator therefrom), and a state of charge estimator 14 linked to the first battery 7, and able to estimate a state of charge (SOC) of the first battery. The state of charge can be estimated by various methods, including in particular by means of a map as a function of the pair {voltage across the battery terminals, current output or absorbed by the battery}. The estimator can also measure the pair {voltage across the battery terminals, current output or absorbed by the battery}, or, while a known alternator voltage is applied, measure only the current of the battery 7. The estimator can then deliver a dimensionless quantity characteristic of the state of charge of the battery, which varies between zero (for a completely discharged battery) and 1 (for a completely charged battery), or deliver a value of the intensity I(SOC) that the battery is capable of absorbing for this particular state of charge. In the first case, the estimator used for the invention can be linked to a second map allowing the intensity I(SOC) to be read as a function of the state of charge SOC. Depending on the variant embodiments, the state of charge SOC of the battery can be computed as an integral of the currents entering the battery (including the exiting currents, counted as negative), divided by the total charge that the battery is able to store when new, or divided by the charge that the battery is capable of storing in its current state of aging.

The intensity I(SOC) of the potential recharging current is the current that the battery would be capable of absorbing if it was at that instant powered by the high alternator voltage. The map used (not represented) therefore depends on the chosen high alternator voltage. However, it is possible to use as default a map of a yield established at another alternator voltage, preferably close to the high alternator voltage. If for example the low alternator voltage is in the order of 13V and the high alternator voltage is in the order of 15V, it is possible to use a map established for the low alternator voltage. A map established at the high alternator voltage will however be more relevant.

The electronic control unit 10 is linked to the ammeter 12, to the meter 13 of the alternator speed and to the state of charge estimator 14 of the first battery. The electronic control unit 10 is also linked to a yield map 15, making it possible to read, as a function of a pair {ω, I}={alternator speed, current drawn by the alternator} established for the alternator 3 operating at the high alternator voltage, a yield of the alternator. Depending on the variant embodiments, the electronic control unit 10 can also be linked to a monitoring unit 16 of the engine that drives the alternator 3 (engine not represented). The monitoring unit 16 can for example be able to detect various modes of driving of the vehicle when the latter is propelled by the single engine, and/or be able to compute an instantaneous yield of the engine, for example using a map linking the operating point (torque, speed of rotation) of the engine and its yield.

On the power network 2 power consuming elements 6 are arranged, such as for example an air conditioning device, lighting means and heating means. The alternator 3 is connected to the terminals of the first battery 7. The second battery 4 is connected in parallel with the first battery 7. The power consuming elements 6 are connected in parallel on the network 2, for example. The network 2 comprises an earth 5 on the vehicle chassis. The network 2 also supplies power to a starter (not represented) able to launch the heat engine of the vehicle in order to initiate the first combustion cycle.

According to the variant embodiments, the first battery 7 can be linked to a DC/DC transformer 8 connected in series to the battery 7, so that the voltage across the terminals of the first battery 7 can be higher than the maximum voltage of the network 2.

In the variant embodiments where the first battery 7 is associated with a transformer of DC/DC type 8, energy production means such as solar panels 9 can be connected to the terminals of the first battery 7, which authorizes the maximum voltage delivered by these solar panels 9 to be higher than the maximum voltage of the network 2. The electronic control unit is linked to the alternator 3, to which it is able to impose a variable setpoint voltage and, notably, two separate setpoint values, a first value denoted Valt_basse and a second value higher than the first value denoted Valt_haute.

The electronic control unit 10 is also linked to the switch 11 which can be of mechanical-electromagnetic type, or of electronic type, for example in the form of a transistor. By opening the switch 11, the electronic control unit 10 can disconnect the first battery 7 from the network, and avoid an accidental discharge of this first battery 7.

The second battery, particularly if the second battery is a lead battery, can preferably be used at the moment of the starting of the heat engine of the vehicle, to supply power to a starter. The electronic control unit 10 disconnects the first battery 7 (for example a lithium battery, and more precisely a battery of lithium-ion type) using the switch 11, as soon as the vehicle is in "parking" mode. In this way the discharging of the battery 7 is avoided. The first battery 7 then remains disconnected from the network until the next starting of the vehicle engine has been carried out.

Lead batteries specifically have an excellent cold start capability, and it is therefore the second lead battery 4 that is used at the moment of starting of the heat engine of the vehicle.

Lithium batteries have better endurance in terms of cycling, and it is therefore the first battery that is used to power the on-board network of the vehicle during the driving of the vehicle. The network voltage, i.e. the voltage measurable across the terminals of the second battery 4, is imposed by that of the three elements, out of the alternator 3, the second battery 4 and the first battery 7 where applicable combined with a DC/DC transformer, which has the highest voltage across its two terminals.

The "terminals" of each of the elements are the two points of connection of this element to the network 2.

In the case where the system includes a DC/DC transformer 8, connected as described in FIG. 1, the "voltage across the terminals of the assembly" [first battery 7, DC/DC transformer 8] is the voltage between the two points of connection of this assembly to the network 2.

When the alternator 3 is not turned on, for example at the moment of starting of the vehicle, and when the first battery 7 is disconnected by means of the switch 11, it is the second battery 4 that imposes the voltage on the network 2.

When the vehicle is being driven and the alternator 3 is in operation, the choice is made to control the setpoint voltage of the alternator 3 above the maximum no-load voltage of the second battery 4. In this way, it is not the second battery 4 that supplies the electric power of the circuit 2. According to whether the voltage of the alternator 3 is higher or lower than the voltage of the first battery 7, it will then be either the alternator 3, or the first battery 7, or both simultaneously, that will supply the electric power of the network 2.

In the context of the invention, a first battery 7 is chosen whose maximum no-load voltage is sufficiently higher than the maximum no-load voltage of the second battery 4 that two operating modes can be imposed in alternation.

In a first operating mode, the alternator voltage is fixed at a low value "Valt_basse", which is higher than the maximum no-load voltage of the second battery "V0max_batt2", itself lower than the maximum voltage tolerated by the network "Vmax_réseau". The alternator voltage "Valt_basse" is less than the maximum no-load voltage of the first battery 7 "V0max_batt1".

In a second operating mode, the alternator voltage is equal to a high alternator voltage value "Valt_haute", which is higher than the low alternator voltage, while remaining lower than the maximum voltage tolerated by the network.

In this way, when the alternator 3 is regulated to deliver the low alternator voltage, and the first battery 7 is sufficiently charged for its voltage to be higher than the low alternator voltage, it is the first battery 7 that supplies the electric power to the network 2. When, in this operating mode, the operating voltage of the first battery 7 drops to the level of the low alternator voltage, part of the electric power of the network 2 is supplied by the first battery 7, and part of the electric power is supplied by the alternator 3.

When the electronic control unit 10 imposes the second operating mode, wherein the high alternator voltage is imposed, if the no-load voltage of the first battery is lower than the high alternator voltage, it is then the alternator that supplies the electric power to the network and which simultaneously supplies an energy allowing the recharging of the first battery 7.

If no other means than the alternator 3 is provided for recharging the first battery 7, the first battery 7 can therefore recharge during the phases where the high alternator voltage is imposed, and can supply the energy to the network while its voltage remains higher than the low alternator voltage, during the phases where the electronic control unit 10 imposes the low alternator voltage.

Preferably a low alternator voltage just higher than the maximum no-load voltage of the second battery is imposed, so that, during the phases where the low alternator voltage is imposed, the alternator draws as little mechanical energy as possible from the engine shaft driven by the heat engine. The alternator thus creates only a limited overconsumption of fuel, while ensuring that the second battery remains constantly charged at its maximum level.

In the first operating mode, while the first battery 7 is sufficiently charged (i.e. while its voltage is higher than the low alternator voltage) it is the first battery 7 that supplies electrical power to the network 2.

The phases where the high alternator voltage is imposed with the aim of recharging the first battery 7 are preferably phases of driving with a low fuel cost, for example the phases of regenerative deceleration. The phases of regenerative deceleration are phases during which the vehicle is in a mode of deceleration allowing the engine brake to be used, and making it possible to use part of the mechanical energy of the engine shaft to make the alternator rotate. For example, to do this it suffices that the setpoint at the pedal of the vehicle corresponds to a phase of deceleration of the engine.

Part of the kinetic energy of braking of the vehicle then serves to recharge the first battery 7. This energy recovered during the braking phases then makes it possible to save fuel, by limiting the alternator voltage imposed during the driving phases corresponding to the first operating mode.

FIG. 2 illustrates an example of relative positioning of the various voltage values mentioned previously in the description of the electric power supply system 1. The various levels represented in FIG. 2 illustrate the minimum no-load voltage of the second battery 4 i.e. V0mini_batt2, the maximum no-load voltage of the second battery 4 i.e. V0max_batt2, the minimum no-load voltage V0mini_batt1 of the first battery 7, the maximum no-load voltage V0max_batt1 of the first battery, the low alternator voltage Valt_basse, the high alternator voltage Valt_haute and the maximum voltage Vmax_réseau that the network 2 is capable of supporting without being damaged.

Typically, if one operates with a lead battery as the second battery 4, and with, as the first battery, a battery of lithium-ion type resulting from the recovery of lithium-ion batteries that have been used to propel electric or hybrid vehicles, the minimum no-load voltage V0mini_batt2 of the second lead battery is in the order of 12 Volts, and corresponds substantially to the minimum no-load voltage V0mini_batt1 of the first lithium battery, or is slightly lower.

The maximum no-load voltage V0max_batt2 of the second lead battery is in the order of 12.8 Volts, and the low alternator voltage Valt_basse that is imposed in order to be just above this maximum no-load voltage is in the order of 13.2 Volts.

The maximum no-load voltage V0max_batt1 of the first lithium battery can be in the order of 16.8 Volts, and the high alternator voltage Valt_haute can be in the order of 15 Volts in order to remain below the maximum value Vmax_réseau accepted by the network, which is itself in the order of 16 Volts.

It is possible to envision using other types of battery for the first and for the second battery, and the maximum voltage of the first battery is not necessarily higher than the maximum voltage of the network. The low alternator voltage must preferably be higher than the maximum no-load voltage of the second battery. It could be possible to envision an embodiment where the low alternator voltage would be slightly lower than the maximum no-load voltage of the second battery, but this would uselessly impose charging and discharging cycles on the second battery while reducing the lifetime of the latter.

The maximum voltage of the first battery will of necessity have to be higher than the maximum no-load voltage of the second battery, so as to be able to define a low alternator voltage value between these two maximum no-load voltage values of the two batteries.

The high alternator voltage can be equal, or even higher than the maximum no-load voltage of the first battery, for example if the maximum voltage of the first battery is lower than the maximum voltage tolerated by the network.

The minimum no-load voltage of the first battery must be lower than the high alternator voltage in order to allow at least partial charging of the first battery 7 during the phases of operation with the high alternator voltage.

The first battery 7 can be recharged, apart from during the phases where the alternator rotates at its high voltage value, by additional electricity production means such as solar panels 9. In the case where the maximum no-load voltage of the first battery is lower than the maximum voltage tolerated by the network, or in the case where the system comprises a DC/DC transformer able to lower the voltage delivered by the first battery to a voltage lower than the maximum voltage tolerated by the network, it is also possible to envision recharging the first battery 7 on a network exterior to the vehicle, for example in a parking area.

The maximum no-load voltage of the first battery 7, i.e. V0max_batt1, can be lower or higher than the maximum voltage accepted by the network 2. If the maximum no-load voltage of the first battery is higher than the maximum voltage Vmax_réseau accepted by the network, in a first variant embodiment, the first battery 7 is used over only a part of its operational envelope i.e. for example between the low alternator voltage and the high alternator voltage.

In a second operational variant, the first battery 7 can be used over a wider envelope, for example between the low alternator voltage and the maximum no-load voltage accepted by the first battery 7, if for example the system is provided with a DC/DC transformer 8, able to lower the voltage delivered by the first battery 7 so as to bring it to a value lower than or equal to the maximum voltage tolerated by the network.

In this case, it is for example possible to envision charging the first battery 7 to its maximum no-load voltage from a network exterior to the vehicle, when the vehicle is at rest. This energy reserve is then used during the driving of the vehicle, completing it with a partial recharging of the battery at a high alternator voltage when the vehicle is in regenerative deceleration.

If the DC/DC transformer is bidirectional, it is even possible to envision charging the first battery to its maximum no-load voltage by raising the voltage across the terminals of the first battery 7 with respect to the high alternator voltage during the regenerative deceleration phases.

Out of a concern for security, in order to avoid even a partial discharge of the second battery 4, the low alternator voltage is chosen slightly higher than the maximum no-load voltage of the second battery 4.

The minimum no-load voltage of the first battery 7 is preferably less than the low alternator voltage so that, when the vehicle is in a driving mode where the low alternator voltage is imposed by the electronic control unit 10, the energy supplied by the alternator automatically comes to complete the energy supplied by the first battery 7 when the voltage of the latter starts to fall. In this way the voltage of the first battery 7 is prevented from decreasing to the minimum tolerated voltage V0mini_batt1.

It might be possible to envision variant embodiments where the minimum no-load voltage of the first battery was higher than the low alternator voltage, but for such a variant it would be necessary for the electronic control unit 10 to impose a high alternator voltage before the voltage of the first battery 7 decreased to below its minimum value. In all these cases, it is necessary for the minimum no-load voltage of the first battery 7 to be lower than the high alternator voltage.

The low alternator voltage is preferably lower than the maximum no-load voltage of the first battery 7. It is as close as possible, as a higher value, to the maximum no-load voltage of the second battery, while keeping a margin of separation in order to ensure that the alternator regulated at low alternator voltage remains above this minimum value V0max_batt2.

It is advantageous to use a first battery 7 whose maximum no-load voltage V0max_batt1 is higher than the maximum voltage Vmax_réseau of the network 2, which makes it possible, when choosing the values of the low alternator voltage and of the high alternator voltage, to have access to the whole range of voltages included between the maximum no-load voltage of the second battery V0max_batt2 and the maximum voltage Vmax_réseau accepted by the network.

In particular, this configuration is found when a vehicle network 2 exists with a maximum acceptable voltage in the order of 15 to 16 Volts, and when a lead battery is used as the second battery 4, the maximum no-load voltage of the lead battery being of around 12.8 Volts, and a lithium-ion battery as the first battery 7, for example a reconditioned lithium-ion battery after being used for the propulsion of an electric vehicle. Such a reconditioned battery for example has a maximum no-load voltage in the order of 16.8 Volts, and an acceptable minimum no-load voltage in the neighborhood of 12 Volts.

Apart from the switch to a high alternator voltage during the phases of deceleration of the vehicle, additional strategies implemented in the electronic control unit 10 can be defined, in order to avoid an excessive discharging of the first battery 7 in situations where the regenerative deceleration phases are not frequent enough and/or long enough.

It is then possible to choose to impose an intermediate alternator voltage between the low alternator voltage and the high alternator voltage, i.e. strictly above the low alternator voltage and lower than or equal to the high alternator voltage. One or more intermediate voltages can thus be imposed during certain phases of driving that can give rise to the supposition that the next decelerations are remote in time. These driving phases can comprise driving modes of the highway type. One or more intermediate voltages can also be imposed for driving modes pre-programmed into the electronic control unit, because the operating point of the engine, for these driving modes, corresponds to a lower fuel consumption than for other driving modes.

The invention proposes a method for managing the alternator during certain driving modes, in order to release an intermediate alternator voltage or a high alternator voltage and to recharge the first battery, while limiting the overconsumption of fuel thus incurred. To simplify the description, it is considered in the remainder of the explanation that the voltage thus imposed is the high alternator voltage.

FIG. 3 shows two graphs 17 and 18. The graph 17 illustrates, for three time intervals 21, 22, 23, values of current intensity delivered by the alternator. The graph 18 illustrates, for the same time intervals 21, 22, 23, the intensity of current received by the first battery 7.

The time intervals 21, 22, 23, illustrated here as successive time intervals, can be mutually independent time intervals, succeeding one another in time in a different order from that illustrated. During the time interval 21, the alternator 3 is controlled at the low alternator voltage. It therefore supplies no current, the current of the network 2 being provided by the first battery 7, having an intensity value "a" equal to 12 A in the example illustrated.

During the time interval 21, the first battery 7 therefore supplies current of intensity "a" to the network whereas the alternator 3 supplies a current of zero intensity, or in other words it does not supply current to the network.

During the time interval 23, it is supposed that the first battery 7 is discharged, and could not itself provide power to the network. To remedy this state of the first battery without generating an excessive overconsumption of fuel, the switch 11 is opened, and the alternator 3 supplies a current intensity "a" to the network 2, without supplying current to the battery.

This operating mode can be proposed if the high alternator voltage phases have not been sufficiently numerous during the previous types of driving of the vehicle, until such time as the phases of regenerative braking type allow the first battery to be recharged at a lower cost.

During the time interval 22, the alternator 3 operates at the high alternator voltage and the switch 11 is closed, so that the alternator 3 supplies to the first battery a current of intensity "b" at the same time that it supplies to the network a current of intensity "a". The first battery 7 therefore receives a current of intensity "b" and the alternator delivers a current of intensity a+b, here of intensity equal to 112 A.

In the illustrated example, the current intensity a absorbed by the network is in the order of 12 Amps, and the intensity of current that the battery is capable of absorbing during recharging is in the order of 100 Amps, which corresponds to a partly discharged battery.

The time interval 21 therefore represents an operating mode that can be used as soon as the first battery is sufficiently charged. The time intervals 22 and 23 represent two operating modes wherein the alternator is driven at the high alternator voltage. Over the time interval 22, the alternator supplies enough current to simultaneously power the battery and the network, which subsequently makes it possible to change back to the operating mode described at the time interval 21. Over the time interval 23 the alternator is driven at its high alternator voltage to supply just the necessary current to the network, so as to limit overconsumption of fuel at that instant.

However, this operating mode requires a subsequent phase of recharging the battery that can either take place during the regenerative braking phases to come, or that will be able to be triggered at an arbitrary moment. However, as a function of the driving mode and of the instantaneous fuel consumption of the network, the fuel overconsumption incurred upon this triggering can be more or less high.

The invention proposes to compare the alternator yield, for the present driving conditions, according to whether one chooses the operating mode illustrated for the time interval 22 or the operating mode illustrated for the time interval 23. This comparison is done using a yield map 15, illustrated in FIG. 4. The choice is then made to trigger the high alternator voltage if the yield corresponding to the operating mode corresponding to the time interval 22 is more favorable than that corresponding to the operating mode of the time interval 23.

FIG. 4 illustrates a map of the yield of the alternator 3. The map 15 links a speed of rotation, here in revs per minute, represented on the x-axis, an output (in Amps) of the current output by the alternator, represented on the y-axis, and a yield of the alternator indicated by the various types of hatching. The alternator yield can for example be defined by the quotient of the instantaneous electrical power output by the alternator, or by the mechanical power supplied to the alternator. The legends corresponding to the various types of hatching indicate the minimum yield of the alternator in the iso-yield region corresponding to this particular type of hatching. Thus, the dense hatching of the maximum yield region 31 forming a substantially circular range on the left of the map delimits a range of yields lying between 80% and 85%. The minimum yield range 32 on the lower right-hand part of the graph corresponds to a range of yields lying between 35% and 40%.

It can be observed on the map 15 that the yields of the alternator are relatively high, in the order of 80 to 85%, for intensities lying substantially between 15 and 80 Amps and for speeds of rotation lying between 1800 revs/minute and slightly over 3000 revs/minute.

These yields then decrease into a substantially concentric area moving away from this optimum area. If one maps a point A onto this map 15 corresponding to a speed of rotation of the alternator during highway driving, i.e. in the order of 6000 revs/minute, and corresponding to a current intensity "a" that is the operating intensity of the network illustrated in FIG. 3, a point A is obtained that is located in the yield range of 60 to 65%.

If one maps a point B onto this same map 15 corresponding, for the same speed of rotation of the alternator, to 6000 revs/minute, and to a current that is the current output by the alternator in the operating mode of the instant 22 in FIG. 3, i.e. in the order of 112 Amps, a point B is obtained that is located in the yield area lying between 70 and 75%.

In other words, the electricity used to supply power to the network 2, and to simultaneously recharge the battery 7, in the operating mode of the time interval 22, is obtained with an alternator yield that is higher by an increment of 10% (absolute value) than the operating mode of the alternator during the time interval 23.

If one imagines that the present driving modes of the vehicle could continue, one might therefore decide to regularly store energy in the first battery, even if the vehicle is not in a regenerative braking phase, rather than produce the electric power just necessary for the power network.

The gain in yield can be less favorable if for example the energy consumed by the power network is higher, making the point A move into a higher yield area, or if the battery is more charged, which reduces the total current that the alternator can output, thereby lowering the point B, possibly until it is made to move into a lower yield region.

FIG. 5 illustrates an operating algorithm of the electronic control unit 10 making it possible to impose a high alternator voltage during certain phases of highway driving wherein the gain in alternator yield seems sufficiently beneficial.

In a step 24, the electronic control unit 10 carries out a test to find out whether the vehicle is in highway driving mode or in another driving mode wherein, by default, a low alternator voltage is imposed.

If such is not the case, the control unit 10 implements a strategy adapted to the other driving modes, based on a step 30. If the test 24 indicates that the vehicle is in highway driving mode, the control unit 10 carries out in a step 25 a test to find out whether the state of charge SOC of the battery 7 is lower than a value $SOC_{max}$.

If such is not the case, the control unit 10 imposes a low alternator voltage in a step 29, and carries out the test 24 again. If the state of charge SOC is lower than the threshold specified in the test 25, in a computation step 26 the control unit 10 uses the values of the speed of rotation $\omega$ of the alternator delivered by the meter 13, the intensity I(SOC) of current that the battery 7 is capable of absorbing—conveyed by the state of charge estimator 14—, and the value $I_{res}$ of the intensity of the current effectively consumed by the network 2—conveyed by the ammeter 12—.

The electronic control unit uses these values to determine two yield values $Rend_1$ and $Rend_2$: $Rend_1$ corresponds to the alternator yield in the hypothesis wherein the alternator, for its current speed of rotation, only delivers the intensity needed for the network, and $Rend_2$ corresponds to the yield that the alternator would have if it delivered both the intensity necessary for supplying power to the network and the intensity that the battery 7 is capable of absorbing.

In a step 27, the electronic control unit 10 then compares these two values to determine whether or not the difference between the second yield and the first yield is higher than an increment $\Delta$. The increment $\Delta$ can for example be in the order of 10% as an absolute value. It is possible to envision defining larger or smaller increments of yield, for example increments of yield going from 7% to 20% increments of yield.

It is also possible to envision quantifying the increment of yield as a relative value with respect to $Rend_1$ or with respect to $Rend_2$.

If the increment of yield is higher than the threshold $\Delta$, the electronic control unit imposes, in a step 28, a high alternator voltage, then carries out the test 25 of evaluation of the state of charge of the battery again. Depending on the result of the test 25, the electronic control unit 10 then returns to the test step 24 or carries out the steps 26 and 27 again.

If the result of the test 27 is negative, i.e. if the difference between the yields is lower than or equal to the threshold $\Delta$, the electronic control unit 10 imposes, in a step 29, a low alternator voltage, and again carries out the test 24 to find out whether the vehicle is still in highway driving mode.

Thus, during the highway driving mode, the electronic control unit 10 imposes a high alternator voltage each time the test 24 indicates that the current driving conditions and the current state of charge of the battery are more favorable to a production of high-amperage electricity than to a production of the energy just necessary to power the network.

The subject of the invention is not limited to the exemplary embodiments described and can be subject to many variants, equally as regards the arrangement of the various elements of the system 1, the operating algorithms installed in the electronic control unit 10 and/or the choice of the types of batteries or other types of accumulators.

The low voltage and the high voltage imposed across the terminals of the first battery 7 can be obtained either by regulating the voltage delivered by the alternator at two different levels, or by raising the voltage across the terminals of the first battery using a DC/DC transformer. The high voltage can also be obtained by raising both the setpoint voltage across the alternator terminals and by transforming this voltage, using the DC/DC transformer, into an even higher voltage across the terminals of the first battery. However, one of the advantages of the invention is that it can be implemented without installing any DC/DC transformer, which makes it possible to limit the implementation costs of the invention.

The operating algorithm, an example of which is given in FIG. 5, is only a simplified algorithm that allows for a great number of variants. The step of testing the state of charge of the battery 7 with respect to a threshold is optional, because a high state of charge also incurs a reduced gain in yield Δ. This algorithm is only a part of a more complex algorithm making it possible to take account of the various driving modes of the vehicle, and to impose, for example, a high alternator voltage during the phases of regenerative braking. Additional tests can be proposed during the monitoring of the alternator during the same driving mode, such as a time lag with respect to the beginning of the detection of this particular driving mode, phases of testing and balancing of various sub-cells constituting the first battery, and/or tests on a minimum critical state of charge of the first battery.

The electrical accumulators designated by the term first and second battery can be accumulator batteries of electrochemical type, for example a second lead battery and a first battery of lithium-ion type. One could also envision using for the first battery other types of lithium batteries than lithium-ion batteries, other electrochemical type batteries or else one or more supercapacitors.

The invention can be used for a system for supplying power to a vehicle driven by a heat engine. It can also be used in respect of a system for supplying electric power to a vehicle with hybrid thermoelectric propulsion, during the phases of propulsion by the heat engine. In the latter case, it is for example possible to use a lithium battery as the second battery serving both for the starting of the vehicle and for occasional driving of the vehicle, and a first battery of supercapacitance type to accumulate energy during the deceleration phases.

The management mode described in FIG. 5 makes it possible, including during driving phases where the energy available for the alternator is not "free", to recharge the first battery by limiting the overconsumption of fuel incurred by this recharging. It is thus possible to use the map of the alternator yield, to impose the high alternator voltage as a function of the yield gain Δ, not only during highway driving, but also for other types of driving or readouts of the state of charge of the first battery. The term "highway driving" in FIG. 5 is therefore only an example. In the same way, the high alternator voltage indicated in FIG. 5 can be an intermediate alternator voltage. The yield map must then be equivalent to a map made for this intermediate alternator voltage.

It is also possible to dynamically modify the alternator yield map, by interposing between the alternator and the engine driving it, which is also an engine propelling the vehicle, a regulator able to vary the drive ratio of the speed of rotation of the alternator and the speed of rotation of the engine. It is thus possible to improve the yield gain Δ, either by systematically offsetting the speed of rotation of the alternator for certain speeds of rotation of the engine, or by offsetting the speed of rotation of the alternator as a function of several simulations of yield gains carried out by the electronic control unit. Other strategies of modulation of the drive ratio are of course envisionable. The control mode of FIG. 5 can be used independently of the presence of a second battery, for example if the first battery is able to start the vehicle.

The system according to the invention makes it possible to reduce the overall fuel consumption of the vehicle, to extend the lifetime of the second battery, and, in the case where a reconditioned lithium battery is used as the first battery, to reduce the cost and the ecological footprint of the system.

The invention claimed is:

1. An electric power supply system for a vehicle including a heat engine able to propel the vehicle, comprising:
   a network of at least one electricity consuming member;
   a first electric accumulator battery connected to the network;
   a controllable alternator connected to the network, driven by the engine, and configured to deliver electric power to the network at a setpoint voltage controllable to at least a strictly positive low alternator voltage, and to a high alternator voltage strictly higher than the low alternator voltage;
   an ammeter configured to measure instantaneous intensity consumed by the network;
   an estimator of a state of charge of the first battery configured to estimate intensity of a potential recharging current that the first battery would be capable of absorbing if the first battery was at that instant powered at the high alternator voltage;
   a meter of a speed of rotation of the alternator;
   an electronic control unit linked to the meter, to the state of charge estimator, and to the ammeter, and linked to a map of the alternator yield as a function of alternator speed and of intensity output by the alternator, the electronic control unit configured to estimate a first alternator yield corresponding to a current speed of rotation of the alternator, and to an intensity of current consumed actually drawn from the network, to estimate a second alternator yield corresponding to the current speed of rotation of the alternator and to the sum of intensities of a potential recharging current of the battery and of the current consumed, and to impose the high alternator voltage if the difference between the second alternator yield and the first alternator yield is higher than a first threshold.

2. The system as claimed in claim 1, wherein the electronic control unit is configured to stop imposing a high alternator voltage if the difference between the second yield and the first yield again becomes lower than a second threshold lower than or equal to the first threshold.

3. The system as claimed in claim 1, wherein the electronic control unit is configured to impose a low alternator voltage if the state of charge of the first battery becomes higher than a third threshold or if the potential recharging current becomes lower than a fourth threshold.

4. The system as claimed in claim 1, wherein the electronic control unit is linked to an estimator of the engine yield, and is configured to impose the high alternator voltage only if the product of the engine yield and the second yield is higher than a fifth threshold.

5. The power supply system as claimed in claim 1, further comprising a second electric accumulator battery connected to the alternator and configured to power a starter configured to launch the vehicle engine, the second battery having a second maximum no-load voltage that is lower than a first maximum no-load voltage of the first battery, and which is lower than the low alternator voltage.

6. The system as claimed in claim 5, further comprising a driving monitoring unit linked to the alternator, configured to detect types of driving of the vehicle, and configured to impose the high alternator voltage during at least certain phases of driving of the vehicle including phases of regenerative braking, and to impose the low alternator voltage during other phases of driving that consume more fuel than the certain driving phases, unless the electronic control unit imposes the high alternator voltage.

7. The system as claimed in claim 6, further comprising a regulator configured to vary a drive ratio between the speed of rotation of the alternator and a speed of rotation of the engine, the driving monitoring unit being linked to the regulator and configured to impose at least a first drive ratio if it detects driving of city type, and to impose at least a second drive ratio lower than the previous one, if it detects driving of highway type.

8. The system as claimed in claim 1, further comprising a regulator configured to vary a drive ratio between the speed of rotation of the alternator and a speed of rotation of the engine, the electronic control unit being linked to the regulator and configured to compute a first alternator yield and a second alternator yield corresponding to the current speed of the alternator, and a first and a second alternator yield corresponding to a different drive ratio from the current ratio, and is configured so that, if the difference between the second alternator yield and the first alternator yield is higher than the first threshold for at least one of the two drive ratios, the control unit imposes the drive ratio making it possible to obtain the highest second alternator yield.

9. A method for managing a motor vehicle including a first battery connected to an alternator and to a power network of the vehicle,
the alternator being controllable to operate either at a strictly positive low alternator voltage, or at least at a high alternator voltage strictly higher than the low alternator voltage, the method comprising:
estimating an intensity of a potential recharging current that the first battery would be capable of absorbing if the first battery was at that instant powered at the high alternator voltage;
estimating a first alternator yield corresponding to a current speed of rotation of the alternator, and to an intensity of effectively consumed current output in the network;
estimating a second alternator yield corresponding to the current speed of rotation of the alternator and to the sum of intensities of the potential recharging current of the battery and of the current consumed; and
imposing a high alternator voltage if the difference between the second yield and the first yield is higher than a first threshold.

10. The management method as claimed in claim 9, wherein the drive ratio is varied between the speed of rotation of the alternator and the speed of rotation of an engine driving the alternator, so as to increase the difference between the second yield and the first yield, for at least a range of speeds of rotation of the engine.

* * * * *

UNITED STATES PATENT AND TRADEMARK OFFICE
CERTIFICATE OF CORRECTION

PATENT NO. : 9,682,629 B2
APPLICATION NO. : 14/362786
DATED : June 20, 2017
INVENTOR(S) : Gerard Saint-Leger et al.

It is certified that error appears in the above-identified patent and that said Letters Patent is hereby corrected as shown below:

On the Title Page

Item (72), The 2$^{nd}$ Inventor's Name is incorrect. Item (72) should read:

-- (72) Inventors: Gerard SAINT-LEGER, Versailles (FR);
                 Sophie GENIN-DEMURE, Antony (FR) --

Signed and Sealed this
Tenth Day of April, 2018

Andrei Iancu
*Director of the United States Patent and Trademark Office*